(No Model.)
J. W. B. COOK.
FIRE KINDLER.
No. 478,249. Patented July 5, 1892.
Fig. 1.
Fig. 2.
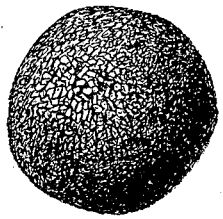 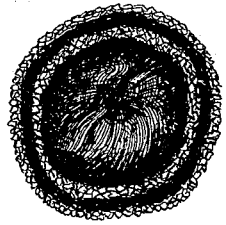
Fig. 3. Fig. 4.
Witnesses;
Percy C. Bowen
J. C. Wilson
Inventor;
John W. B. Cook
By Whitman & Wilkinson
Attorneys.

UNITED STATES PATENT OFFICE.

JOHN W. B. COOK, OF CAMDEN, ARKANSAS.

FIRE-KINDLER.

SPECIFICATION forming part of Letters Patent No. 478,249, dated July 5, 1892.

Application filed September 25, 1891. Serial No. 406,812. (No specimens.)

*To all whom it may concern:*

Be it known that I, JOHN W. B. COOK, a citizen of the United States, residing at Camden, in the county of Ouachita and State of Arkansas, have invented certain new and useful Improvements in Fire-Kindlers; and I do hereby declare the following to be a full, clear, and exact description of the invention, such as will enable others skilled in the art to which it appertains to make and use the same.

My invention relates to improvements in fire-kindlers; and it consists in preparing a fire-kindler from waste paper and such other inflammable materials, as will be hereinafter described.

Reference is had to the accompanying drawings, wherein the same parts are indicated by the same letters.

Figure 1 represents a scrap of paper saturated with saltpeter and cut in the size desired. Fig. 2 represents the same crumpled up ready for soaking in the resin mixture. Fig. 3 represents the finished fire-kindler, and Fig. 4 a section thereof.

The method of preparing the fire-kindler is as follows: Waste paper, be it from newspapers, wrapping-paper, or any other kind of paper, is dipped in a solution of saltpeter and water, in about the proportion of one pound of saltpeter to one gallon of water. The paper is then removed and dried. After it is thoroughly dried it is cut into small bits of, say, from four to five inches square. Each one of these bits is then squeezed or crumpled up by hand and dipped in a mixture of turpentine, resin, and saltpeter, sufficiently warmed to cause the resin to melt and mix thoroughly with the turpentine and saltpeter. After dipping in the resin mixture roll in dry pine sawdust, again dip in the resin mixture, roll again in the pine sawdust, and the fire-kindler is ready for use. The sawdust is used in the first rolling to act as an absorbent and to keep the viscous materials from running, and in the second rolling to prevent the balls from sticking together in packing or to the hands in use. The proportions of the inflammable mixture are: resin, twenty pounds; turpentine, one gallon; saltpeter, five ounces. I preferably use Chili saltpeter or sodic nitrate on account of its greater cheapness over the potassic nitrate, the hygroscopic properties of the sodic nitrate being obviated by the turpentine and resin, which effectually keep out the air and moisture.

Having thus described my invention, what I claim, and desire to secure by Letters Patent of the United States, is—

A composition of matter adapted to be applied to paper for use as a fire-kindler, consisting of sodic nitrate, resin, turpentine, and sawdust.

In testimony whereof I affix my signature in presence of two witnesses.

JOHN W. B. COOK.

Witnesses:
   G. L. RITCHIE,
   JOS. LEVY.